United States Patent [19]

Hudson et al.

[11] Patent Number: 4,914,623

[45] Date of Patent: Apr. 3, 1990

[54] DIGITAL PROCESSING OF SENSOR SIGNALS FOR READING BINARY STORAGE MEDIA

[75] Inventors: Geoffrey M. Hudson; Kingsley J. F. Allen, both of Victoria, Australia

[73] Assignee: Hudson-Allen Limited, Box Hill, Australia

[21] Appl. No.: 98,372

[22] Filed: Sep. 18, 1987

[30] Foreign Application Priority Data

Sep. 18, 1986 [AU] Australia ............................ PHO8102

[51] Int. Cl.⁴ .......................... G06F 3/05; G11B 7/09
[52] U.S. Cl. .................................. 364/900; 364/932; 364/926; 369/46; 369/59; 235/456
[58] Field of Search ... 364/200 MS File, 900 MS File; 353/25, 26 R, 26 A, 27 R, 27 A; 369/46, 59, 44; 235/456, 494

[56] References Cited

U.S. PATENT DOCUMENTS

| | | |
|---|---|---|
| 3,072,889 | 4/1955 | Willcox . |
| 3,322,935 | 5/1967 | Wyke et al. . |
| 3,437,793 | 4/1969 | Berkel et al. . |
| 3,542,286 | 10/1967 | Binkley et al. . |
| 3,633,014 | 3/1970 | Lemp et al. . |
| 3,710,323 | 1/1973 | Andrews et al. . |
| 3,727,183 | 4/1973 | LeMay . |
| 3,795,902 | 3/1974 | Russell . |
| 3,820,104 | 6/1974 | Fearon . |
| 3,968,475 | 7/1976 | McMahon . |
| 4,075,605 | 2/1978 | Hilley et al. . |
| 4,228,468 | 10/1980 | Nagano et al. ...................... 358/280 |
| 4,263,504 | 4/1981 | Thomas ............................... 235/454 |
| 4,327,440 | 4/1982 | Furuya et al. ........................ 375/76 |
| 4,344,152 | 8/1982 | Laurer et al. ........................ 364/900 |
| 4,345,314 | 8/1982 | Melamud et al. .................... 364/515 |
| 4,355,301 | 10/1982 | Isshiki et al. . |
| 4,365,304 | 12/1982 | Ruhman et al. ..................... 364/515 |
| 4,382,298 | 5/1983 | Evans ..................................... 371/6 |
| 4,430,748 | 2/1984 | Tuhro et al. ........................... 382/50 |
| 4,479,194 | 10/1984 | Fogg et al. ............................ 364/900 |
| 4,513,444 | 4/1985 | Okai et al. ............................. 382/56 |
| 4,514,854 | 4/1985 | Ashida ..................................... 375/94 |
| 4,545,031 | 10/1985 | Kobayashi ........................... 364/900 |
| 4,621,343 | 11/1986 | Fujieda et al. ....................... 364/900 |
| 4,695,991 | 9/1987 | Hudson ................................. 369/44 |

FOREIGN PATENT DOCUMENTS

| | | |
|---|---|---|
| 82/02267 | 7/1982 | PCT Int'l Appl. . |
| 742463 | 8/1950 | United Kingdom . |
| 1363810 | 7/1972 | United Kingdom . |
| 2027963 | 8/1979 | United Kingdom . |

*Primary Examiner*—Thomas M. Heckler
*Attorney, Agent, or Firm*—Cushman, Darby & Cushman

[57] ABSTRACT

An apparatus and method for processing an electrical signal produced by one or more sensors in a device for reading binary storage media, whereby the signal represents a set of successive stored binary values. Digital values which represent a selection of two or more samples of the electrical signal are combined using digital circuits to produce an intermediate digital representation which is then processed to derive one of the binary values. The combining and processing steps are repeated for other selections of the samples to obtain the desired set of successive stored binary values.

31 Claims, 10 Drawing Sheets

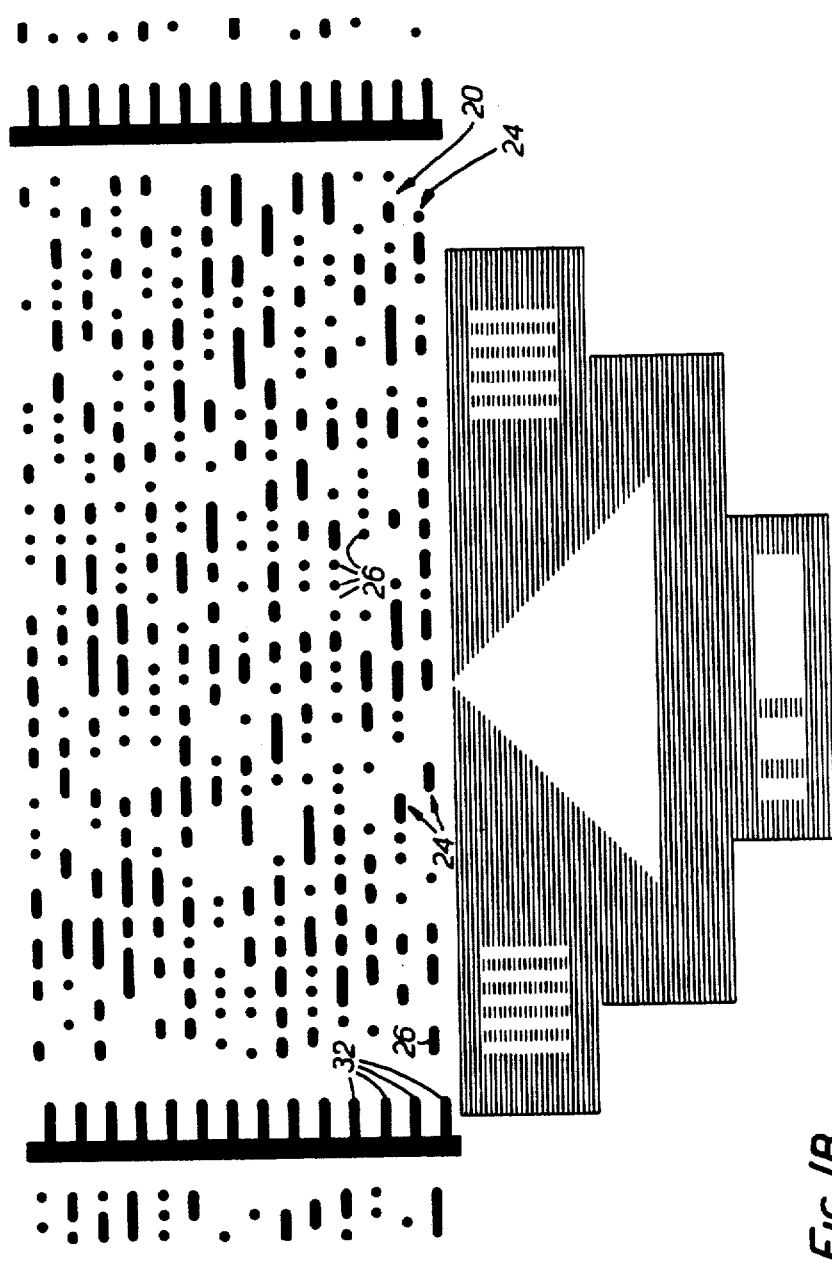
FIG. IB.

DIGITAL PROCESSING OF SENSOR SIGNALS FOR READING BINARY STORAGE MEDIA

FIELD OF THE INVENTION

This invention relates generally to the digital processing of electrical signals and in particular to the digital processing of an electrical signal which is produced by one or more sensors in a device for reading binary storage media and which represents a set of successive stored binary values. In specific applications, the invention is concerned with the reading of information stored in a medium as multiple machine readable record entries, typically bits of binary data.

The electrical signal would normally be an analog signal in which values for an observed parameter are indicated by voltage or current outputs from one or more sensing elements. The sensing elements may, for example, be observing the magnetic field of a medium in its immediate vicinity or the opacity or reflectivity of an optically sensed medium.

BACKGROUND OF THE INVENTION

The most common method of obtaining a digital signal from an analog one, where a digital value of either one or zero is expected, is to use a comparator to compare a voltage or current with a reference signal. The comparator typically outputs one of the two voltages corresponding to the two possible binary values. Various and often sophisticated techniques have been described for the purpose of enhancing the signal in analog form using analog circuits before conversion to digital values, as have been digital error correction techniques used to enhance the resulting digital data.

In the particular application of processing signals received from a detector which is reading densely arranged information in binary code and which itself is a read head comprised of multiple detector elements, the outputs of the elements do not necessarily coincide with the values on the medium unless, at the very least, there is precise registration between the two. The past approach for achieving adequate registration between read heads and data has been to ensure sufficient mechanical precision in the location of read heads with respect to the data. To circumvent the increasing mechanical difficulty and cost of achieving registration with increasing data density, U.S. Pat. No. 4,695,991 discloses a compensation technique entailing manipulation of the observed values instead of attempts to achieve actual registration. However, there remain difficulties with that technique, in its various embodiments, in handling the increasing influence of multiple bits on the output of a single detector element as the data density increases, for example arising from the optics of a photosensitive detector arrangement.

SUMMARY OF THE INVENTION

The invention provides a method of processing an electrical signal produced by one or more sensors in a device for reading binary storage media, which signal represents a set of successive stored binary values, comprising:

combining digital values which represent a selection of two or more samples of the electrical signal, using digital circuits, to produce an intermediate digital representation of the samples of the selection;

processing said intermediate digital representation to derive one of the said binary values; and repeating said combining and processing steps for other selections of said samples whereby to obtain said set of successive stored or communicated binary values.

The initial electrical signal may itself comprise a sequence of samples so that the digital values represent some or all of the samples of the sequence, or the signal may be successively sampled and digitised, e.g. at successive intervals, to produce the digital values.

A set of the digital values representing samples of the electrical signal may first be produced and the digital values then combined for each selection in turn.

Each sample may be included in a plurality of the selections and may thereby contribute to a plurality of the intermediate digital representations. The actual number of selections in which each sample is included will vary with the particular circumstances of each analysis.

The digital values for each selection of samples are preferably also combined with one or more further digital values providing information about the electrical signal and/or about the relationship of samples within the electrical signal. Each said selection of samples is advantageously dependent upon these further digital value(s): in one preferred application of the invention, each such selection is made with regard to a predetermined spatial relationship between multiple secondary sources generating said electrical signal and multiple primary sources to which said secondary sources are responsive. The same selection of samples may be combined with different further digital values to produce two different digital representations of the selection.

Each selection of two or more samples preferably comprises a selection of immediately successive samples.

The intermediate digital representation is preferably utilized to address a memory store, e.g. a read-only memory. The contents of the aforesaid address may be utilized by being directly output as the binary value for the set. Alternatively, the store may contain predetermined values which indicate a propensity for a binary value to be 1. The memory store may have been computed from a mathematical model of the sensing apparatus, or may have been assembled experimentally.

Said processing of each such indicator value preferably further includes comparing the intermediate digital representation and/or a derivation of the intermediate digital representation such as the aforesaid predetermined values, with one or more reference levels, and outputting a binary value in dependence on such comparison. In general, the binary value output may be either a 0 or 1. Plural such reference levels may be provided and the comparison may be made with one or more of these levels in a predetermined sequence.

For enhanced analysis, two or more of the intermediate digital representations may be processed together to derive each binary value. Such joint processing may comprise addition of contributions derived from the respective digital representations.

The invention also provides apparatus for processing an electrical signal produced in a device for reading binary storage media, which signal represents a set of successive stored or communicated binary values, comprising digital circuitry means for combining digital values which represent each of plural selections of two or more of samples of the electrical signal to produce an intermediate digital representation of the samples of the respective selection; and means for processing each said intermediate digital representation to derive a respective one of the said binary values.

The apparatus may be configured to include each of the optional and preferred features described above in connection with the method. The digital circuitry means may comprise a digital shift register and the processing means preferably includes a memory store, e.g. a read-only memory. The contents of this store may be output binary values, or predetermined values which indicate the propensity of a binary value to be 1. The processing means may further include adders or Boolean logic processors for comparing the intermediate digital representation, or a derivative thereof, with one or more reference levels or logical tests.

In a particular advantageous application, the invention affords a method of reading information comprising a set of successive binary values stored in a medium as multiple machine readable record entries arranged in frames which are themselves arranged in one or more channels, which record entries are indicative of values from a limited set of possible values, the method comprising:

observing each frame in turn with a substantially known array of detector elements such that each record entry is at least partly within the field of observation of at least one detector element, whereby to produce a first set of observed binary values for each frame represented by the states and/or outputs of the detector elements;

outputting those states and/or outputs as an electrical signal comprising a sequence of observed values representing said stored binary values;

combining digital values which represent a selection of two or more samples of the electrical signal, using digital circuits, to produce an intermediate digital representation of the samples of the selection;

processing said intermediate digital representation to derive one of the said binary values; and repeating said combining and processing steps for other selections of said samples whereby to obtain said set of successive stored binary values.

Preferred apparatus for carrying out this method comprises:

a holder to temporarily support or retain said medium;

a substantially known array of detector elements movable relative to said holder;

means to scan each frame with said array such that each record entry is at least partly within the field of observation of at least one detector element to produce a first set of observed values for each frame represented by the state and/or outputs of the detector elements;

means to output those states and/or outputs as an electrical signal comprising a sequence of observed values representing said stored binary values;

digital circuitry means for combining digital values which represent each of plural selections of two or more of samples of the electrical signal to produce an intermediate digital representation of the samples of the respective selection; and means for processing each said intermediate digital representation to derive a respective one of the said binary values.

The invention will be further described, by way of example only, with reference to a specific application, viz the reading of information stored in a medium as an ordered array of optically machine readable record entries each comprising bits of binary data. Such an application of the invention is an improvement with respect to the concepts disclosed in U.S. Pat. No. 4,695,991, but it is to be emphasized that such application is strictly an exemplary utility of the invention, which is concerned generally with the digital processing of an electrical signal comprising a set of multiple successive values.

BRIEF DESCRIPTION OF THE DRAWINGS

In the accompanying drawings:

FIGS. 1A and 1B respectively depict in plan a magnified (47×) portion and a smaller further magnified (6×) sub-portion of a microfiche in which information is stored in multiple optically machine readable record entries;

DETAILED DESCRIPTION OF THE PREFERRED EMBODIMENT

Figure 1A:
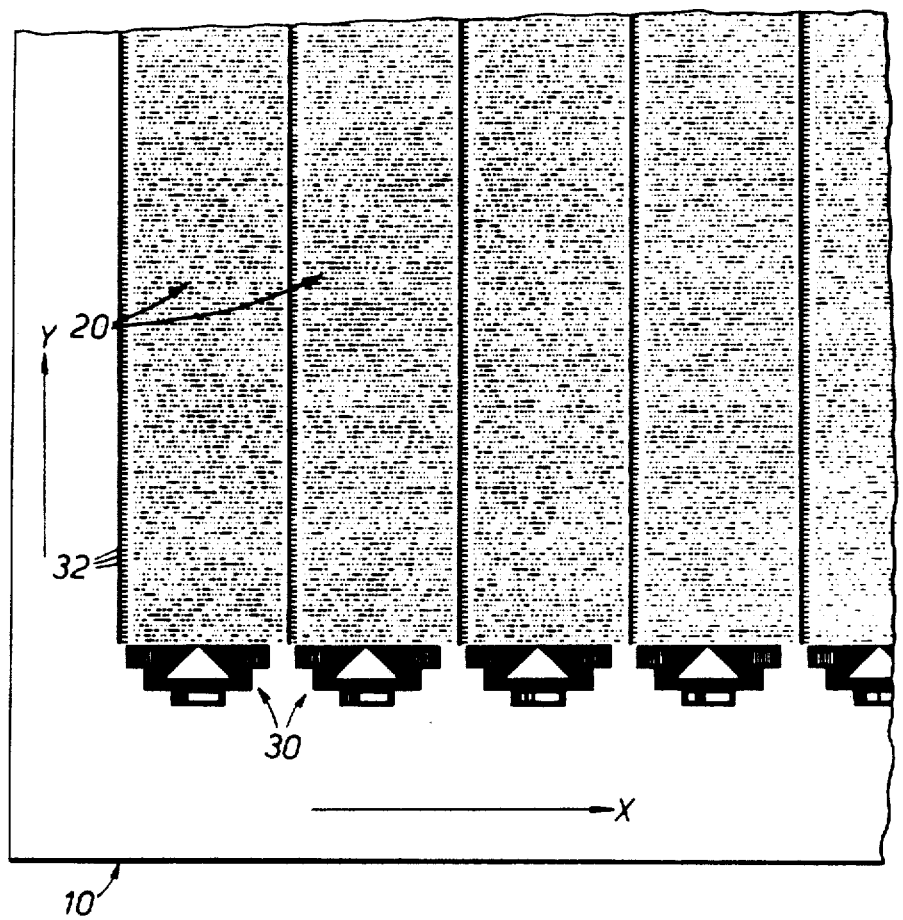

For the purposes of explanation, the ensuing discussion shall be based upon a number of simplifications. It will be assumed that the medium in which the information is stored is a microfiche, and that such information comprises binary data arranged as equi-spaced record entries in a series of linear record frames in one or more parallel channels. The frames extend perpendicularly to the channels and the record entries are indicative of the binary numbers 1 and 0, these comprising the limited set of possible values. Hence the record entries, which might for example comprise spots of substantially variable opacities, typically translucent and opaque spots, will herein be referred to as bits. It is to be emphasized that none of these simplifications constitute limitations on the ambit of the invention. For example, the record entries might be spots of magnetization or transitions from one value of opacity, or one magnetic field intensity or direction, to another, and a cartesian arrangement of the data, while presently thought to be optimal, is certainly not mandatory.

In a practical microfiche prepared along the above lines, the data may typically be arranged so that each channel is about 600 micron wide and comprises 7 longitudinal segments of about 9 mm each containing 800 frames of data bits. Each frame is 6 micron wide and each spot 6 micron in diameter at centres 6 micron apart. The frames are separated by a gap of, say, 12 micron. The microfiche may be, e.g., a silver halide master or a diazo copy thereof.

An illustration or photograph of a microfiche thus envisaged cannot be very informative as to detail. FIGS. 1A and 1B respectively illustrate a magnified (47×) portion and a smaller further magnified (6×) sub-portion of a representative fiche 10 on which data bits 26 are arranged in parallel channels 20, each divided into blocks or segments of groups of parallel frames 24. One of the possible values of the parallel bits, say 1, is positively indicated by a translucent "spot", but adjacent spots merge to form translucent bars. The other value, 0 in the example, is indicated by sustained opacity at the regular site for the bit.

The start ends of each channel segment, and therefore also the start of the channel, are preceded by a respective specially configured position indicator in the form of a channel synchronisation marker 30, having certain prescribed relationships to the respective channel segment as disclosed in U.S. Pat. No. 4,695,991. Each frame 24 is associated, in a prescribed spatial relationship also disclosed in this patent publication, with its own position indicator comprising synchronisation marker 32. Markers 30 are geometrically similar, as are markers 32. Markers 32 for each frame are interconnected as depicted.

Fiche 10 is conveniently read by scanning along each channel in turn with a linear detector comprising multiple detector elements. A single detector might of course scan along each frame and thereby read each data bit in turn but it is much preferred to utilise a linear array of detector elements of span greater than a frame and so simultaneously read all bits of each frame in a single multi-element exposure. It is also preferable for the purposes of the invention that each record entry is at least partly within the field of observation of at least one detector element, and that each detector element has a limited field of observation and responds to each record entry within its field of observation in relation to the fraction of the record entry within such field of observation. A suitable such detector is a multiple elment photosensitive line image sensor designed for optical imaging at high sensitivity and speed. Such a sensor is typically associated with a charge-coupled device by which the charge state of each element is passed via a transfer gate to analog transport shift registers for storage. Such registers store the charge and then transport it to the output stage when required. This transport operation generally proceeds at constant speed so that the time at which a value is read bears a known relationship to the position of the respective detector element along the array.

An example of a commercial detector of this type is the Fairchild CCD 111, manufactured by the Fairchild Camera & Instrument Corporation of Palo Alto, Calif. The CCD 111 has 256 photosensitive detector elements in linear array, each element being of rectangular configuration in the plane of the array.

Figure 2:
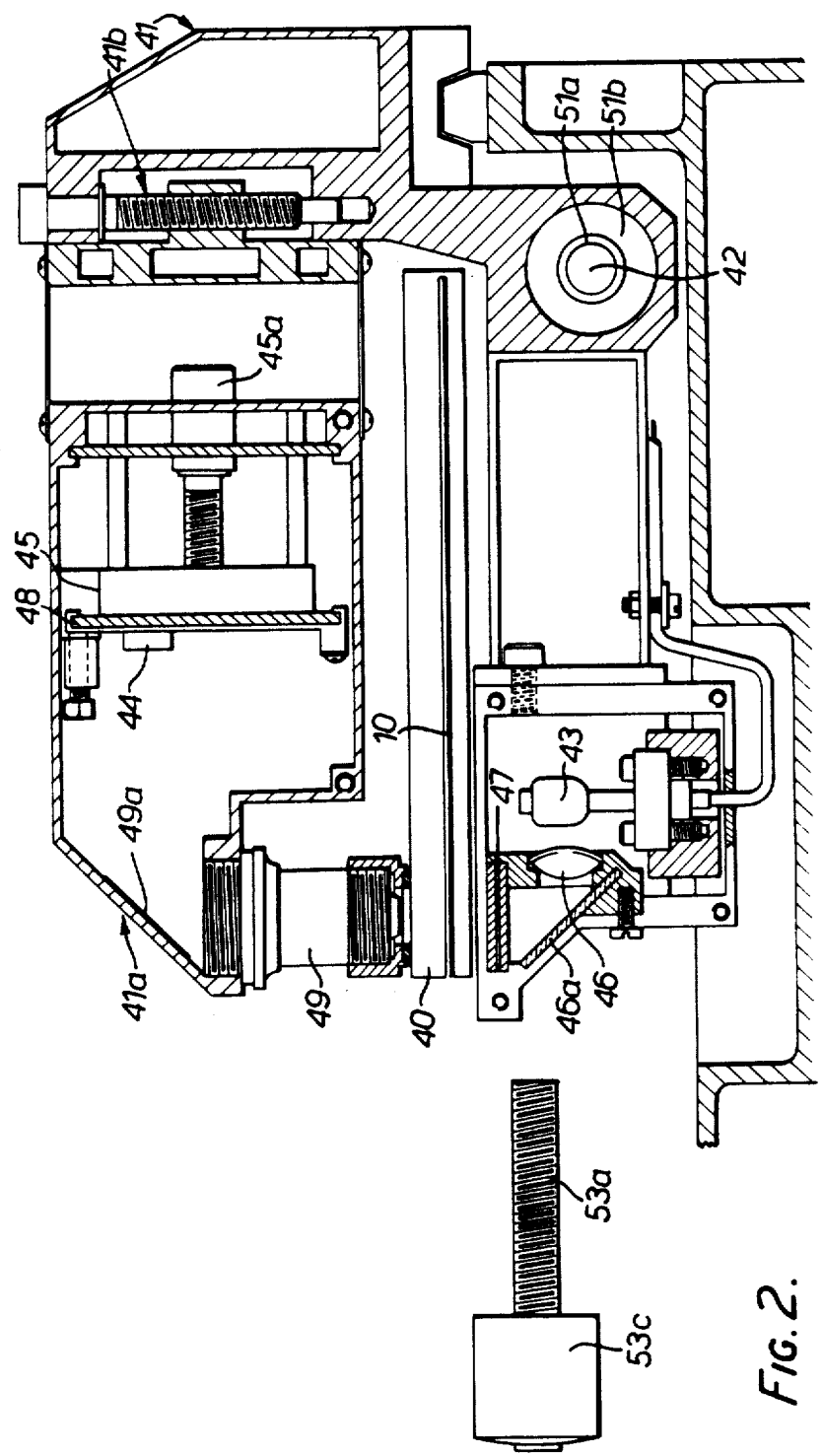
FIG. 2 schematically depicts a simple arrangement for reading the fiche shown in FIG. 1.

FIG. 2 schematically depicts a reader arrangement showing the principal components. Microfiche 10 is held in a glass platen 40 which moves from left to right and vice-versa while the illumination and optics assembly 41 (including read head 41a) moves on an axis 42 perpendicular to the paper. The illumination system comprises a bulb 43, a condensing lens 46, a mirror 46a to allow the illumination system to take less space, and filters 47. The light passes through platen 40 and fiche 10 and into a focussing lens 49, thence via another mirror 49a onto the photosensitive detector 44. That detector is served partly by other electronics mounted on the same printed circuit board 48 as the detector, and by other circuits not shown. Detector 44 is mounted to a carriage 45 which is movable for focus adjustment by a manual drive 45a. The whole read head 41a, housing lens 49, detector 44, carriage 45 and drive 45a are mounted at 41b for adjustment to and from platen 40.

Movement of platen 40 and assembly 41 is effected by separate drives comprising respective screw and nut mechanisms each powered by a suitable electric motor. The screw 51a and ball-race nut 51b of the mechanism for assembly 41 are visible in FIG. 2, which also shows in the left inset the electric motor 53c and screw 53a for platen 40. The axis of screw 53a is of course parallel to but out of the plane of the rest of FIG. 2.

It will be seen that the two drives are operable to selectively relatively move read head 41a relative to the fiche in either or both of two mutually perpendicular directions, parallel to the channels and parallel to the frames, so that the read head may scan each frame in turn, channel by channel. It is preferred that the drive relatively moves the microfiche at substantially constant velocity parallel to the data channels and perpendicularly to the frames, but in a stepwise motion parallel to the frames and perpendicular to the channels.

In use, the array of detector elements comprising detector 44 is exposed by the optics including lenses 46, 49 to light filtered by each frame in turn and so temporarily stores a charge in each of its constituent elements directly representative of the light intensity on that element from within a defined field of observation for the element determined by the interaction of the element with the optics. The device thus has the property that each constituent detector element responds to each record entry within its field of observation in relation to the fraction of the record entry lying within the field of observation of the respective detector element.

Figure 3:
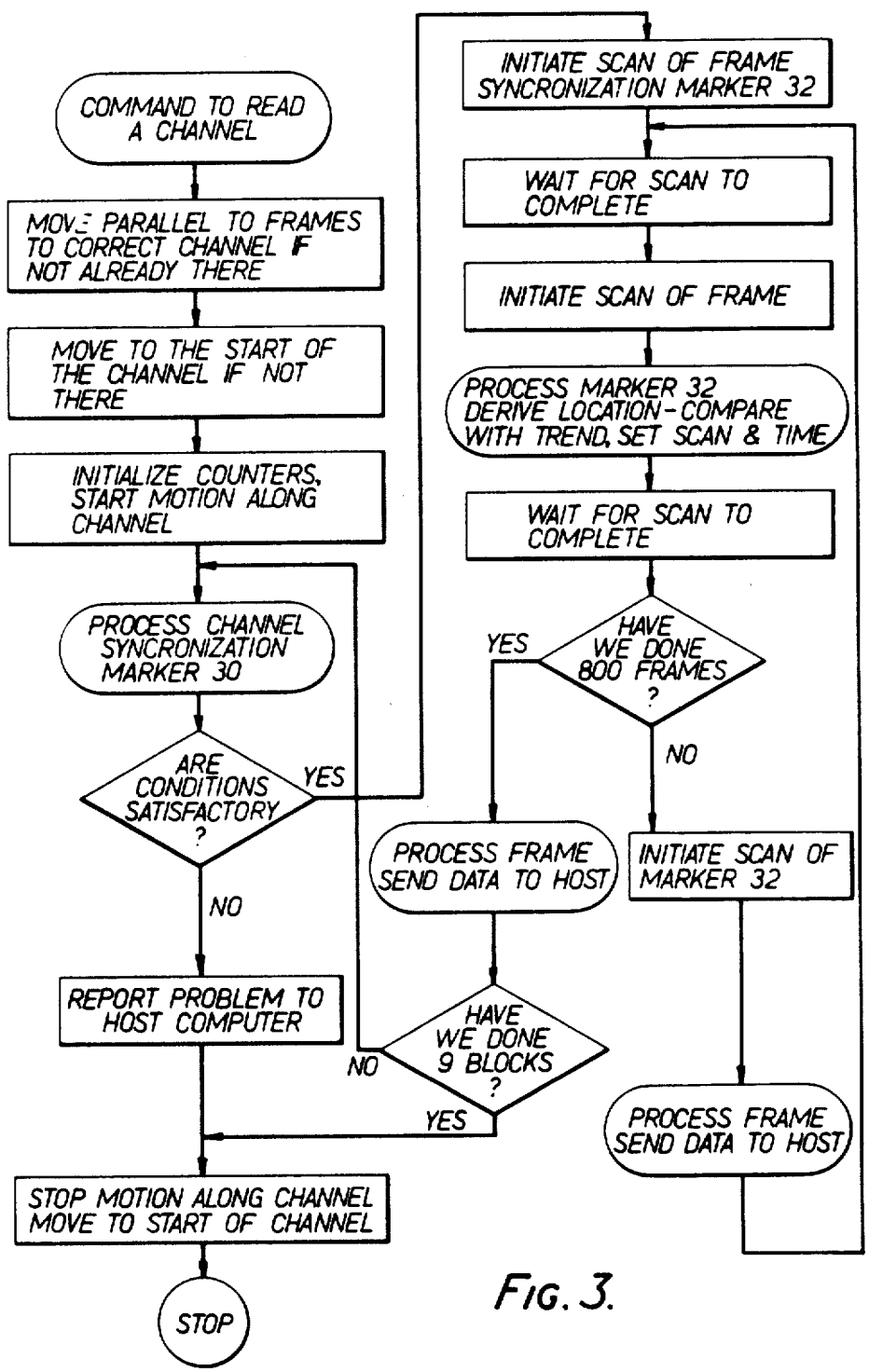
FIG. 3 is a flow diagram for the principal steps in scanning and reading a channel of the fiche.

FIG. 3 is a simple flow chart outlining the sequence of steps executed by the reader arrangement as it scans, reads and analyses the information on the fiche. The first stage of such action will be to position the read head 41a at the start of the desired channel 20, and to start a relative motion of the channel passing under the read head. Next a marker 30 will be encountered. The examination of such markers (further detailed in U.S. Pat. No. 4,695,991) will typically involve a number of scans of the fiche by the photosensitive array, yielding the position of the array relative to the channel to a high level of confidence, and the relative orientation of the read head with the channel, the range of detector outputs likely to be observed, and the velocity of the channel relative to the read head. If one or more of these parameters are such that correct data extraction cannot be achieved then the mechanical system will be instructed to move the microfiche to the start of the channel and the problem will be reported to the host (micro) computer.

If conditions are found satisfactory, the read head moves relatively forward and scans the first of the markers 32 and then the first frame of the channel. PROCESS MARKER 32 is detailed in U.S. Pat. No. 4,695,991. PROCESS FRAME is in part the subject of the present invention and will be described more fully.

Following the exposure of each frame to the detector, the detector serially outputs a chain of electrical voltages indicative of the charge stored in each element of the detector. Because there has been no provision for exact registration of the detector elements with respect to the bits on the microfiche, it is necessary to process the output signal from the detector in order to determine the true bit values and it is this processing with which the present invention is concerned.

Figure 4:
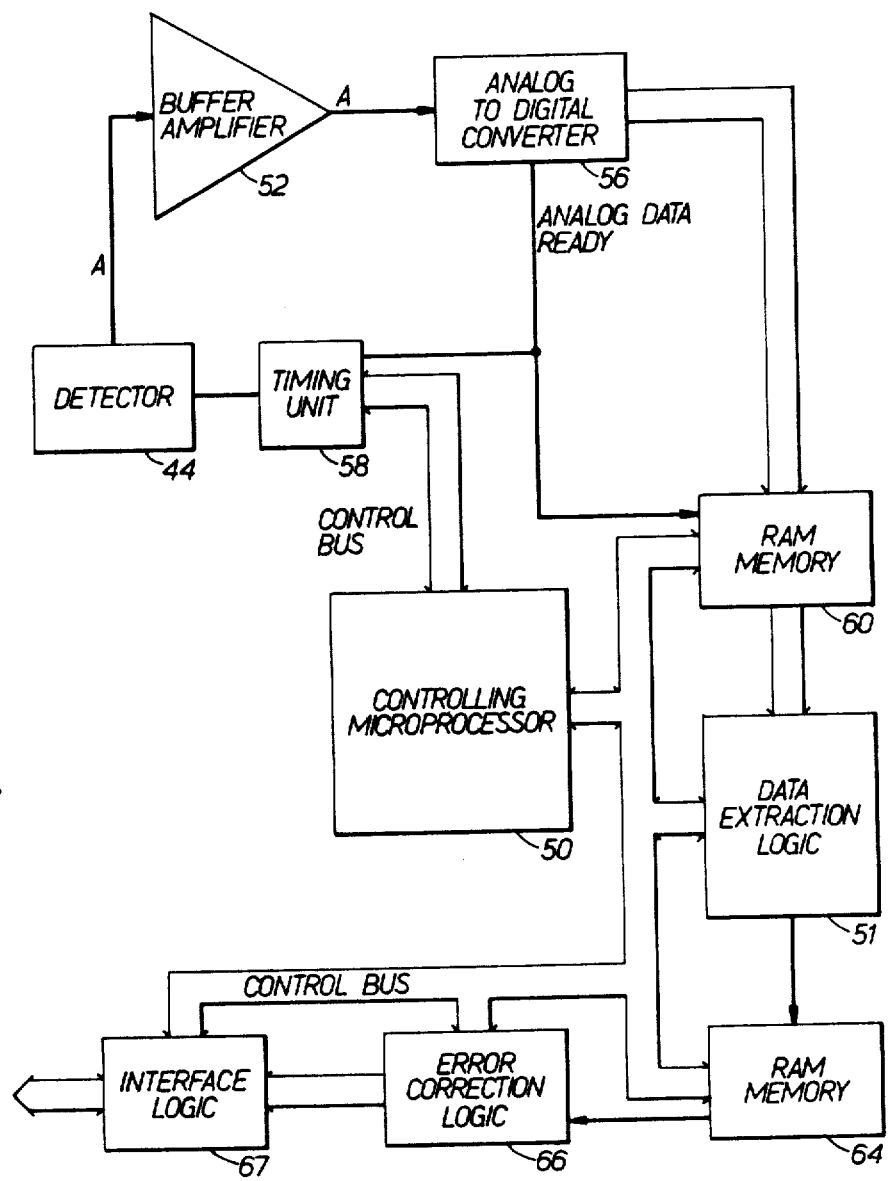
FIG. 4 is a block circuit diagram of an arrangement for practising a first embodiment of the invention under microprocessor control.

With reference to FIG. 4 the analog output of detector 44 is buffered and conditioned by a buffer amplifier 5 and analog signal conditioner 52. The signal conditioning is simple, typically involving removal of "common mode" components such as those generated by temperature changes. The analog signal is then directly converted to a digital signal by the analog-to-digital (A/D) converter 56 when a pulse "Analog Data Ready" is issued by a timing unit 58. Immediately after each conversion, the digital signal comprising a small number (say 4) bits is passed to the first Random Access Memory (RAM) unit 60. In most applications of this invention, a high-speed analog-to-digital conversion, such as that provided by the "Flash Converter" TDC1021J produced by TRW, will be required.

In the application of the invention to data extraction from binary microfiche, a microprocessor 50, e.g. a Motorola M6809, controls the data acquisition, extraction and correction process. It sets the speed of timing unit 58 and sends a pulse to that unit when the signals from the detector 44 are to be presented to the buffer amplifier and thence to the analog to digital A/D converter. In addition, the microprocessor 50, establishes memory address settings and access modes in RAM memories 60 and 64, and stores various constants in data extraction logic 51.

Microprocessor 50 further oversees the processing according to the preferred practice of the present invention, performed by the data extraction logic 51, which determines the binary values on the medium from the combination of the binary representation of the signal supplied by the analog-to-digital converter 56 stored in the RAM 60 and other signals. In the case of binary microfiche, the "other signals" or "further digital values" may specify the position of the centre of the bit being extracted relative to the centre of the detection element whose output was last read from RAM 60. In other applications, the further digital values might represent quiescent conditions such as temperature or angular velocity, or signals related to neighbouring bits such as the bits in adjacent tracks on a disc.

The bits determined by the data extraction logic are stored in RAM 64 and then processed by error correction logic 66 in fashion similar to that exhibited in existing computer equipment. Logic 66 outputs via interface logic 67.

Figure 5:
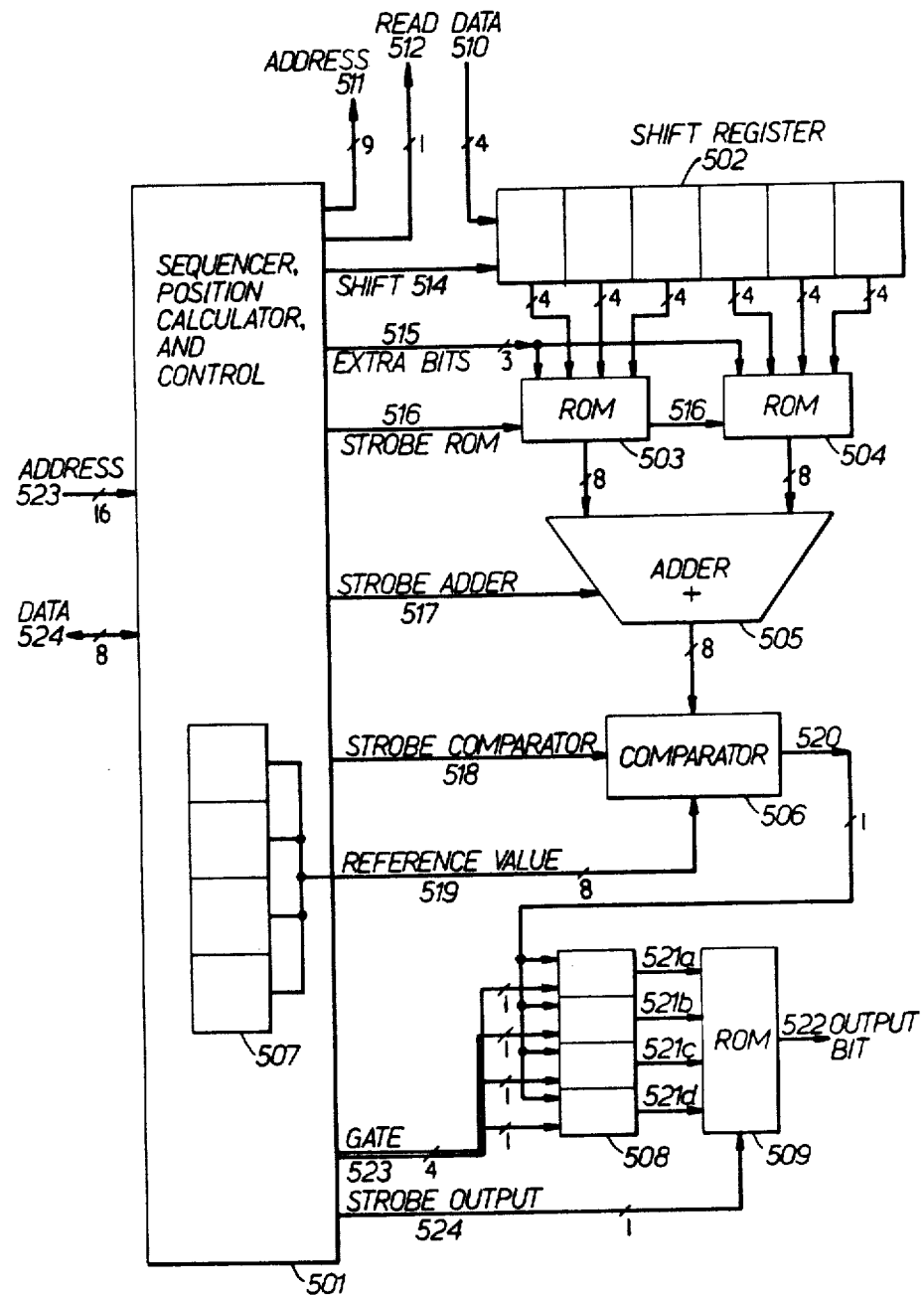
FIG. 5 is a functional block diagram, for the data extraction logic module 51 indicated in FIG. 4.
Figure 6:
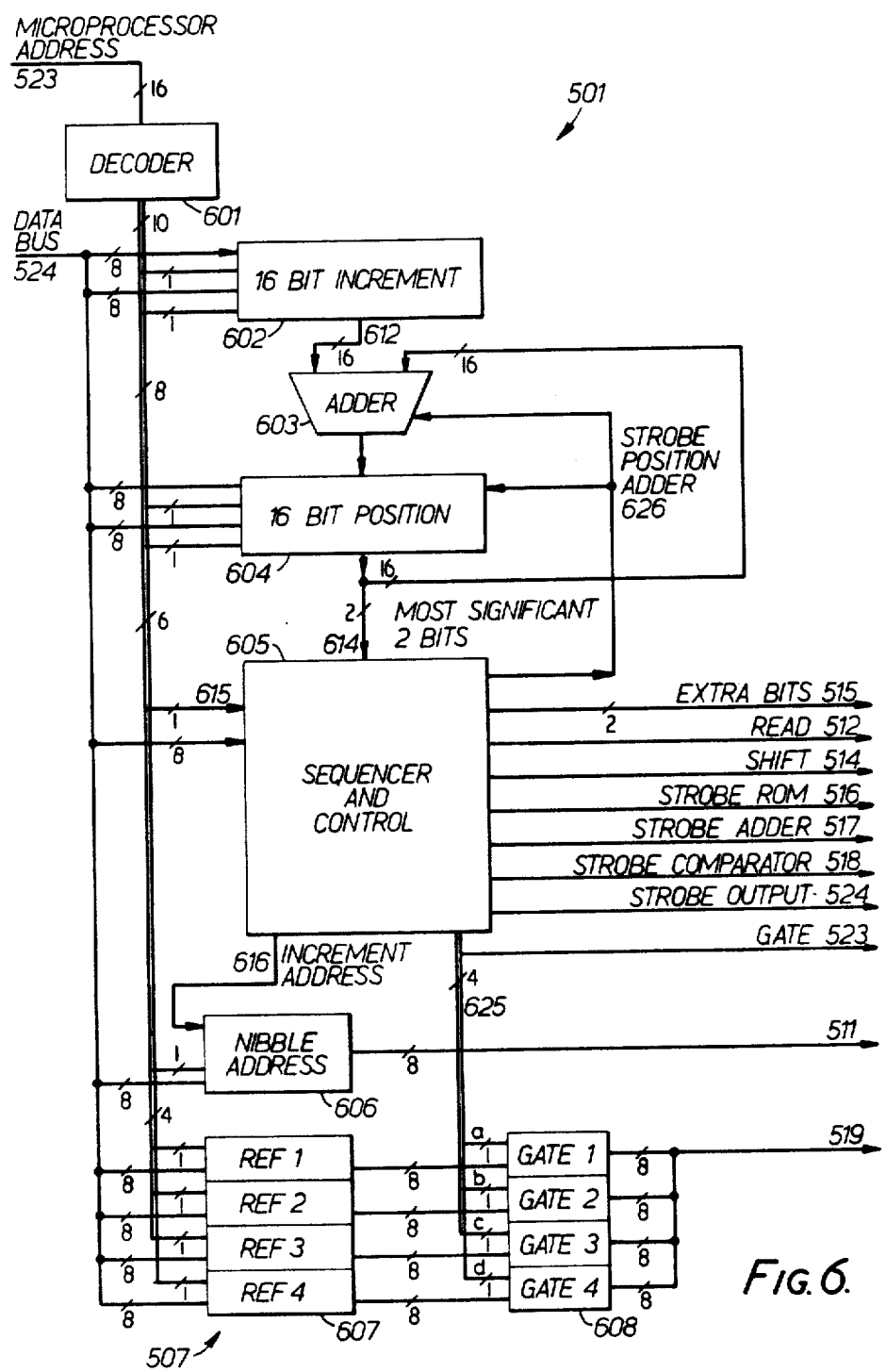
FIG. 6 is a more detailed block diagram of the sequencer, position calculator and control segment depicted in FIG. 5.

The novel aspect of this invention is the data extraction process exemplified in detail in FIGS. 5 and 6, which show one embodiment of the data extraction logic 51 in functional block form for the case where data is being read from binary microfiche. Parts not shown consist only of repetitions of the system shown with minor changes such as reduction of the number of samples included in a determination so that a single ROM replaces the two ROMs and the adder. The 1 or 2 digit numerals against connecting lines in FIGS. 5 and 6 indicate the number of distinct wires making up each connection. The components shown in FIG. 5 are as follows:

501: A sequence and control unit that generates commands and strobe signals for the other components which do the actual processing of the intermediate digital value to determine the binary value (bit) concerned. This unit is further explained in FIG. 6. Additional detail is provided in FIG. 8.

502: A shift register to store data from the RAM 60 (FIG. 4). This register is able to store 6 nibbles each of 4 bits, that word size being sufficient for reading data from binary microfiche. This register 502 will contain 6 nibbles representing the signal size at 6 successive samples. The contents of the register constitute an intermediate digital representation of a selection of samples of the input signal.

503: Two Read only memory (ROM) units which are
504: addressed by data in shift register 502, 3 nibbles at a time, and by extra bits or "further digital values" 515 generated by unit 501. These bits 515 indicate, e.g. the density of the data in the fiche or whether the fiche is diazo or vesicular. Bits 515 may also indicate the positon of the bit being read from the microfiche, relative to the nearest detector element. ROMs 503, 504 preferably produce 8 bit values representing vector dot products on receipt of a stroke pulse 510. ROMs 503, 504 contain values which indicate propensity for a bit to be a 1. These values are assembled either by experimental observation or by computation from a mathematical model of the sensing apparatus. The ROMs provide one technique of producing vector dot products. One vector is the intermediate digital representation of the sampled selection and the other vector is chosen from a set of one or more constant vectors.

505: An adder which will compute the sum of the values in the reference cells in the ROMs.

506: A digital comparitor which generates a "1" output if the sum produced by the adder 505 exceeds the selected digital reference value, or "0" otherwise.

507: A set of 8 bit wide storage registers which store Reference values for presentation to the comparitor 506. Components 607 and 608 in FIG. 6 are represented as component 507 in FIG. 5.

508: A set of bit storage registers to store the "1"s and "0"s produced by the comparitor 506 to specify an address.

509: A ROM whose contents are the correct values for final output bits given the "1"s and "0"s from the comparitor as stored in register 508. The ROM is a general implementation of voting logic since the outcome for any given set of "votes", i.e. tests, can be independently recorded and addressed. The voting logic typically provides a hierarchical sequence of tests so that the output bit at 522 is determined if one of an initial pair of tests is satisfied, but if neither is satisfied, the next pair is considered.

FIG. 6 is a more detailed block diagram for the unit 501 of FIG. 5. The components of unit 501 comprise:

601: A decoder which reads the 16 bit address 523 on the microprocessor bus, and determines if that address refers to any of the 10 registers shown in FIG. 6. The decoder would typically test the high order 12 bits for a particular value, and if that test was successful it would assert one of 10 lines selected by the value of the low order 4 bits.

602: A 16-bit increment register showing the number of sensor elements or sensor samples to be advanced between one bit evaluation and the next. In general this will not be a whole number, and typically the low order 14 bits will represent a fractional value.

603: A 16-bit wide adder which receives the contents 612 of the increment register as an input 603 and adds them to a position register 604 on being strobed by a signal 626 from the sequencer/control unit 605 described below.

604: A bit position register which shows the fractional part of the sensor element of sample number for the bit being processed. In the case where the increment always falls between x.75 and y.25 where y=x+1, then the full integral part of the position register need not be stored. In most steps to the next bit, the sample/sensor address should be advanced by y, with variations of plus or minus 1 at every 4th step at most. This adjustment is arranged by a ROM sequencer within unit 605.

605: A sequencer and control unit which is a (multiple) state machine based on a ROM. Its role is to determine the sequence of events such as:

fetching another nibble (4 bits) of data from the RAM 60 and shifting it into the shift register 503, strobing the ROMs 503, 504 (signal 516), the adder 505 (signal 517), and the comparitor 506 (signal 518) to compute another bit of the address of the final bit in ROM 509, and gating register 508 to store that bit, and commanding the ROM 509 to produce the final output bit 522 (signal 524), and incrementing the count of bits completed.

606: A Nibble address register which is loaded by the microprocessor 50, and incremented by the sequencer 605, and which addresses 4 bit quantities in RAM 60.

607: Four 8 bit wide Reference registers, containing values to be compared with the output of adder 505.

608: Four 8 bit wide gates to select the Reference value to be presented to comparitor 506.

Figure 8:
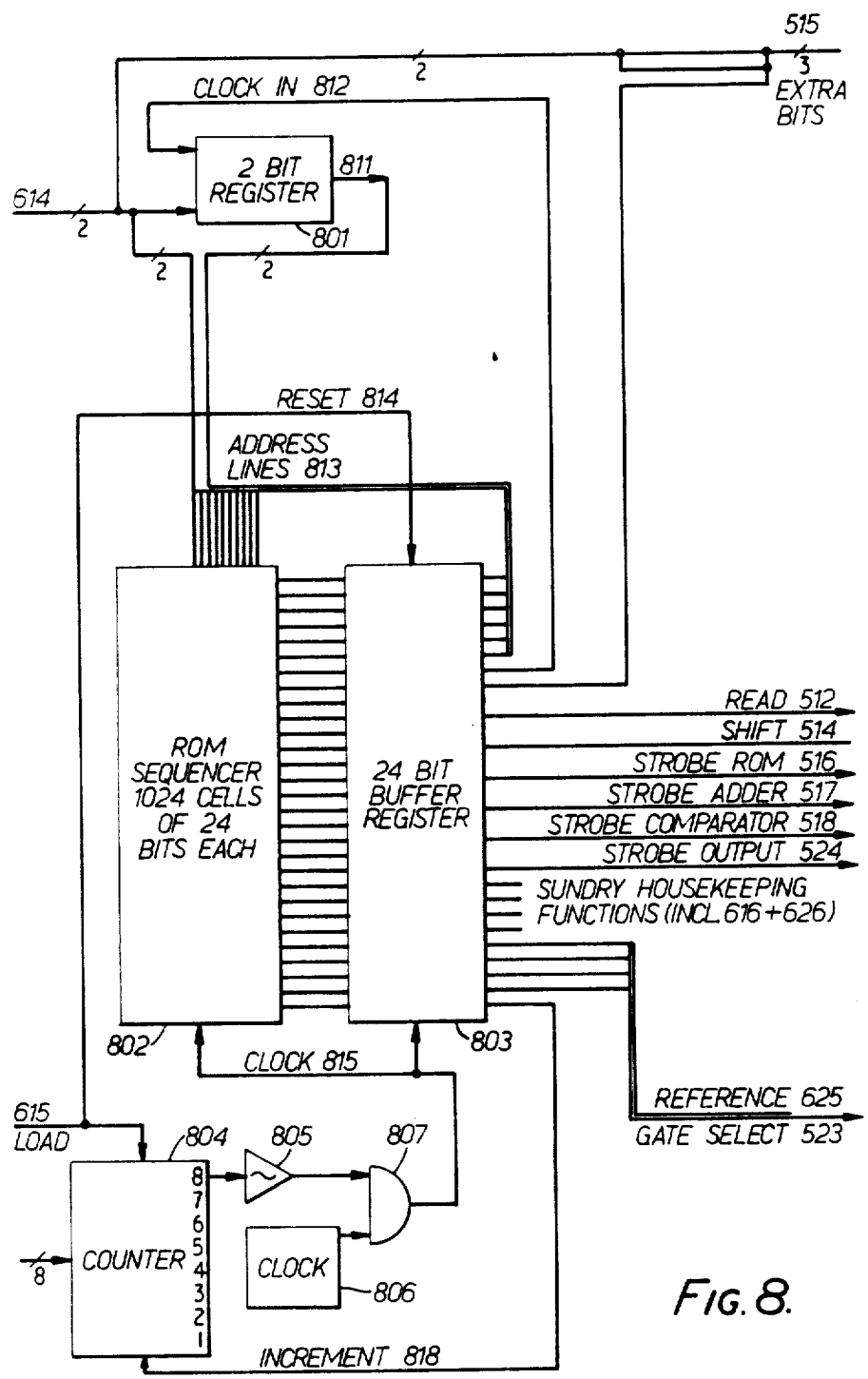
FIG. 8 is a more detailed diagram of the sequencer/control of FIG. 6.

The sequencer and control unit 605 is detailed further in FIG. 8 and includes:

801: A 2 bit register to store the 2 most significant bits of the fractional part of the position register 604 before it is incremented by the value stored in register 602. This allows the change in these bits to influence whether the Sequencer 605 varies the number of sensor elements/samples to be shifted into shift register 502.

802: A Read Only Memory (ROM) containing the signals to be applied to each strobe line and timing signal (512, 514, 516, 517, 518, 524, 626) at each stage of the processing of the intermediate digital signal, a clock pulse 812 for register 801 and also part of the address of the next cell in that same ROM to be used to determine the next values for all these signals.

803: A Buffer register to store the signals produced by ROM 802.

804: An 8 bit up/down counter which is loaded by the microprocessor 50 (signal 615), and then incremented by the ROM sequencer (802, 803) (signal 818) each time a bit is completed. Once the correct number of bits have been done, the most significant bit of the counter 804 will be set, and processing will halt.

805: An inverter to negate the true signal from the significant bit of counter 804.

806: a free running clock producing pulses or a square wave at an appropriate frequency, say 10 MegaHertz, to step the state machine provided by ROM 802 to the next state on each pulse or rising edge.

807: An AND gate to allow the pulses or rising edges from the clock to propagate 815 to clock the ROM 802 and the buffer 803.

To discuss the operation of the processing of the digital signals in this example, it is useful to consider several time subdivisions, viz:

T1: The time associated with reading a particular medium, e.g. a particular floppy disc or microfiche. This time would typically be minutes to hours.

T2: The time for the processing of a group of sensor signals/samples which should be treated similarly, but might represent several bits. This time would probably be a small number of milliseconds or hundreds of microseconds. Event T2 would be likely to occur thousands or millions of times each time a medium is loaded.

T3: The time is extract a single data bit. This is likely to be a small number of microseconds or hundreds of nanoseconds. T3 would typically occur 30 to 300 times in each event T2.

T4: The time for a single step of the Sequencer unit 605. This is likely to be in the range 10 to 100 nanoseconds, and would occur 10 to 100 times in each T3 event.

The reference values stored in registers 607 and the increment stored in the Increment Register 602, would typically be loaded via databus 524 by the microprocessor 50 once per time T1, i.e. once per physical medium. These values might be constant from one medium to another and stored in ROM is some implementations, but there is merit in allowing the microprocessor 50 to directly examine the digitized sensor output, and to determine the optimum values for these parameters. FIG. 4 shows a bus path between the microprocessor 50 and the RAM 60, so that the microprocessor can read the digitized signals from detector 44. By examining these signals, and by simulating the anlysis done by the data extraction logic 51 and the error correction logic 66, the microprocessor can find the values for thresholds and for the position increment which give the lowest raw error rate, and hence the most reliable data. This parameter determination process could extend to values in ROMs 503, 504 and 509, in which case these memories would be RAMs rather than ROMs.

Each time T2 a group of detector samples is generated and stored in RAM 60, the microprocessor establishes the initial Nibble address and loads it via databus 524 into Register 606. This determination is achieved by the microprocessor examining data in RAM 60 which might reflect the presence of special markers such as described in the aforementioned U.S. Pat. No. 4,695,991. This same process is employed to generate the (fractional) position to be loaded into Position Register 604. With all registers now loaded, the microprocessor 50 writes a number N, less than 128, into sequencer 501 to request processing of 128-N bits. Decoder 601 is addressed via line 523 and generates a load pulse 615 for ROM sequencer 605. Sequencer 605 generates a sequence of signals to load 6 nibbles into register 502 to establish the intermediate digital representation to be processed. The system is now ready to determine bit values. More particularly, the number N is written into count register 804. Load pulse 615 is also a reset 814 for buffer register 803 so that the low order bits of the address are zero. At each location, ROM 802 stores bits to generate the aforementioned sequence of signals.

Each time T3, the Sequencer 501 performs one or more evaluations of the intermediate digital representation in shift register 502. In each evaluation, the Extra bits 515 may be set to select ROM areas, the ROMs 503 and 504 are strobed by a strobe signal 516 to present the contents of the addressed location to the adder 505 (or in other implementations directly to the comparitor 506 or even the output 522). The adder is then strobed 517 to present the sum to the comparitor. At the same time a reference value is selected by asserting a signal on one of the lines 625, and a gate to a bit register in Register group 508 is enabled by signal 523. The comparitor 506 is then strobed by signal 518 to store its output 520 in the selected cell in Register 508.

Once the required number of evaluations (in this case 4) has been completed, the sequencer issues Strobe Output signal 524 to command the output ROM 509 to gate its signal 522 to the error processing logic 66 (FIG. 4) which is not part of this invention and of known design. Sequencer 501 then issues a sequence of pulses to Increment Nibble Address counter 606 (pulse 616) so that the address lines 511 point to the next nibble in RAM 60, to strobe RAM 60 (Read pulse 512), and to shift the nibble presented into Shift Register 502 (pulse 514). This is done several times (say 2 or 3) depending on the previous (signal 811) and present (signal 614) most significant bits of the Position in register 604. The timing of this latter process is illustrated in the timing diagram given in FIG. 7.

At the completion of each bit, a signal 626 strobes adder 603 to determine the position of the next bit and thereby determine the number of nibbles to be shifted into register 502.

Data 510 from RAM 60 (FIG. 4) is received by Shift Register 502 which can store 6 "nibbles" (of 4 bits each). Thus the register 502 contains an intermediate digital representation of a selection of samples of the input signal. They can be thought of as hexadecimally digital although they are actually stored in binary form.

Figure 5A:
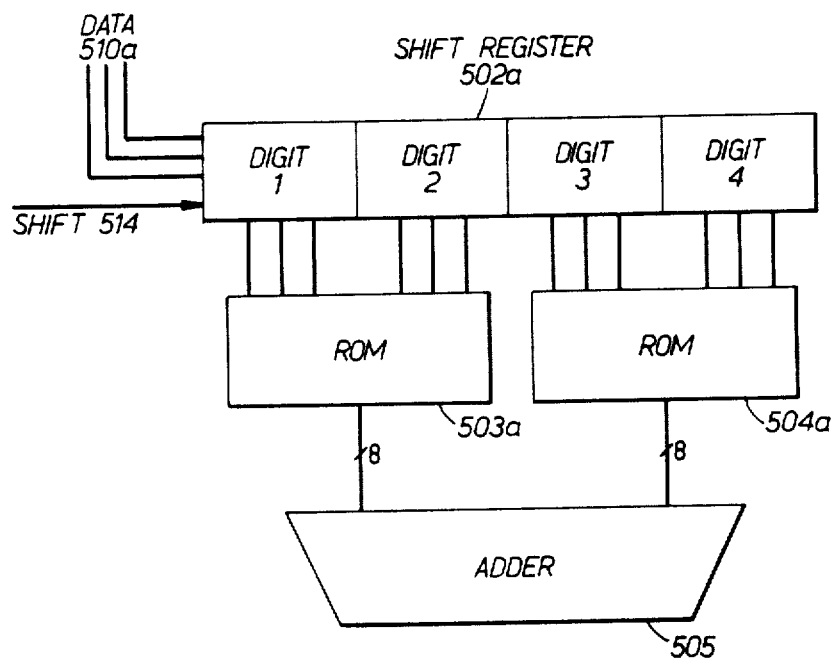
FIG. 5A is a simpler form of part of the diagram of FIG. 5, referred to herein for purposes of illustration.

A major benefit of the digital representation and the processing thereof is the reduction of the influence of neighbouring bits on the bit whose value is being determined. To illustrate this it is necessary to consider the contents of the ROMs 503 and 504. However, each of these ROMs contains 16,384 8 bit numbers, so listing of their contents would serve more to hide the principles than to reveal them. Accordingly, a smaller example is considered. In this example, the samples are represented by 3 bit numbers (octal digits) rather than 4 bit numbers, only 4 samples are included in the shift register rather than 6, and no extra bits are considered. With these values, the top right part of FIG. 5 becomes as shown in FIG. 5A.

Suppose the Sequencer 501 was programmed to locate the samples/sensor values most closely associated with the bit whose value is being determined in the middle of the shift register, i.e. in digits 2 and/or 3. Digits 1 and 4 would then indicate the influence of other bits and these digits would be taken to oppose digits 2 and 3 in as much as a high value in digits 1 or 4 would indicate that some of the value in digits 2 and 3 would be due to bits other than the bit being evaluated. Table I might be used in this simpler example:

TABLE I

| | | Example of Contents of ROMs 503a, 504a (FIG. 5A) | | | | | | | |
|---|---|---|---|---|---|---|---|---|---|
| Digit 1 or 4: | | 0 | 1 | 2 | 3 | 4 | 5 | 6 | 7 |
| | 0 | 0 | 0 | 0 | 0 | 0 | 0 | 0 | 0 |
| | 1 | 10 | 0 | 0 | 0 | 0 | 0 | 0 | 0 |
| | 2 | 20 | 10 | 0 | 0 | 0 | 0 | 0 | 0 |
| Digit | 3 | 60 | 20 | 10 | 10 | 0 | 0 | 0 | 0 |

TABLE I-continued

| | | Example of Contents of ROMs 503a, 504a (FIG. 5A) | | | | | | | |
|---|---|---|---|---|---|---|---|---|---|
| Digit 1 or 4: | | 0 | 1 | 2 | 3 | 4 | 5 | 6 | 7 |
| 2 | 4 | 100 | 60 | 50 | 40 | 30 | 20 | 10 | 0 |
| or | 5 | 120 | 100 | 80 | 60 | 60 | 40 | 20 | 0 |
| 3 | 6 | 120 | 120 | 110 | 100 | 80 | 60 | 60 | 40 |
| | 7 | 120 | 120 | 120 | 110 | 100 | 80 | 60 | 60 |

In this case a sum of 120 from ROMs 503a and 504a would indicate a 1. While both ROMs would contain the same numbers, they would be ordered differently in that ROM 503a would take the numbers down the columns starting at the left, ROM 504a would have the numbers across the rows starting at the top.

The contents of ROMs 503, 504 would generally be determined by a combination of computer simulations of the medium and the detector and by trials of the actual apparatus, utilizing the predetermined addressing scheme. The computer simulations might use a known data pattern, and predict the detector output value corresponding to each bit in the pattern under a variety of conditions. The trials could be used to confirm or correct the computer simulation, or by reading known patterns from the medium and using a circuit which stored the values in these patterns rather than reading them, could record the values to be stored in the ROM.

The extra 3 bits 515, being the most significant in the ROM addresses, will select different areas in the ROMs appropriate to different conditions, or different tests. Provision for 3 bits allows 8 different tests, but not all 8 may be used for each bit determination. The sequencer will assert these lines at appropriate stages to select the test used. The tests chosen may depend on which type of medium is being read (where several similar but slightly different media are used), or ambient conditions and in these cases, the bits would be set by the controlling microprocessor 50.

In the implementation shown, two tests are performed for each bit. When the changed bit is 0, it selects test 1 whose results are compared with thresholds 1 and 2, when it is 1, it selects test 2 whose results are compared with thresholds 3 and 4.

In general, a multiplicity of ROMs would be used, perhaps with a pair of threshold values for each ROM set, in order to compensate for other factors besides the influence of neighbouring bits. One of the threshold values would test to see if the bit was a 1 and the other would test to see if it was a zero. If neither test was successful, then the bit would be determined by other ROMs and threshold values. To illustrate how the ROM 509 can provide this control, consider the following rules:

Rule 1: If the first sum is equal to or greater than 120, the bit is a 1.
Rule 2: If the first sum is less than or equal to 40, the bit is a zero.
Rule 3: If the first sum is between 40 and 120, and a second sum (perhaps using a different part of the ROM) is greater than 80 then the bit is a 1, otherwise it is a zero.

In this case, only 3 tests are required, and only 3 thresholds, and 3 bits in the bit register 508. These may be summarized in Table II:

TABLE II

| | Illustration of Contents of Voting ROM 509 | | |
|---|---|---|---|
| Bit # | 1 | 2 | 3 |
| Threshold | 120 | 40 | 80 |

TABLE II-continued

| Illustration of Contents of Voting ROM 509 | | | | | | |
|---|---|---|---|---|---|---|
| A 1 means | $x > 120$ | $x > 40$ | $y > 80$ | Where $x$ = first sum, $y$ = second sum | | |
| A 0 means | $x \leq 120$ | $x \leq 40$ | $y \leq 80$ | | | |
| Case # | | | | Bit | Value Comment | Ruling Test |
| 0 | 0 | 0 | 0 | 0 | $x \leq 40, y \leq 80$ | 2 |
| 1 | 0 | 0 | 1 | 0 | $x < 40, y > 80$ | 2 |
| 2 | 0 | 1 | 0 | 0 | $40 < x < 120, y \leq 80$ | 3 |
| 3 | 0 | 1 | 1 | 1 | $40 < x < 120, y > 80$ | 3 |
| 4 | 1 | 0 | 0 | 1 | Impossible, $120 < 40$ | 1 |
| 5 | 1 | 0 | 1 | 1 | Impossible, $120 < 40$ | 1 |
| 6 | 1 | 1 | 0 | 1 | $x > 120, y < 80$ | 1 |
| 7 | 1 | 1 | 1 | 1 | $x > 120, y > 80$ | 1 |

It is clear that a memory arrangement such as that described, can cover every possible requirement for voting logic. It also has the merit of being inexpensive, and easily changed during production.

It can be that some tests are more reliable than others. The voting logic described above ascribes a higher reliability to rules 1 and 2, than to rule 3. In the event that a rule of lower reliability determines the bit, this could be noted in another area of memory, and exploited by error correction logic. The area reserved for storing these doubtful indications could be the same size as the actual data, and all bits could be zero except where a low reliability test was used. Alternatively a count of bits to the next bit of low reliability, or other data compression formats could be used. The low reliability indication would come from ROM 509 which would then have two output bits addressed by the test results.

The low reliability indication could be used when errors are detected but in such quantity as to render their location impossible. For example a single Error Correcting, Double Error Detecting (SECDED) code might have a double bit error and an attempt to correct this error might be made by flipping the bits which were determined by unreliable tests.

Thus, in such an embodiment, the error correction logic would assess each derived binary value according to the logical test employed in its derivation.

Figure 7:
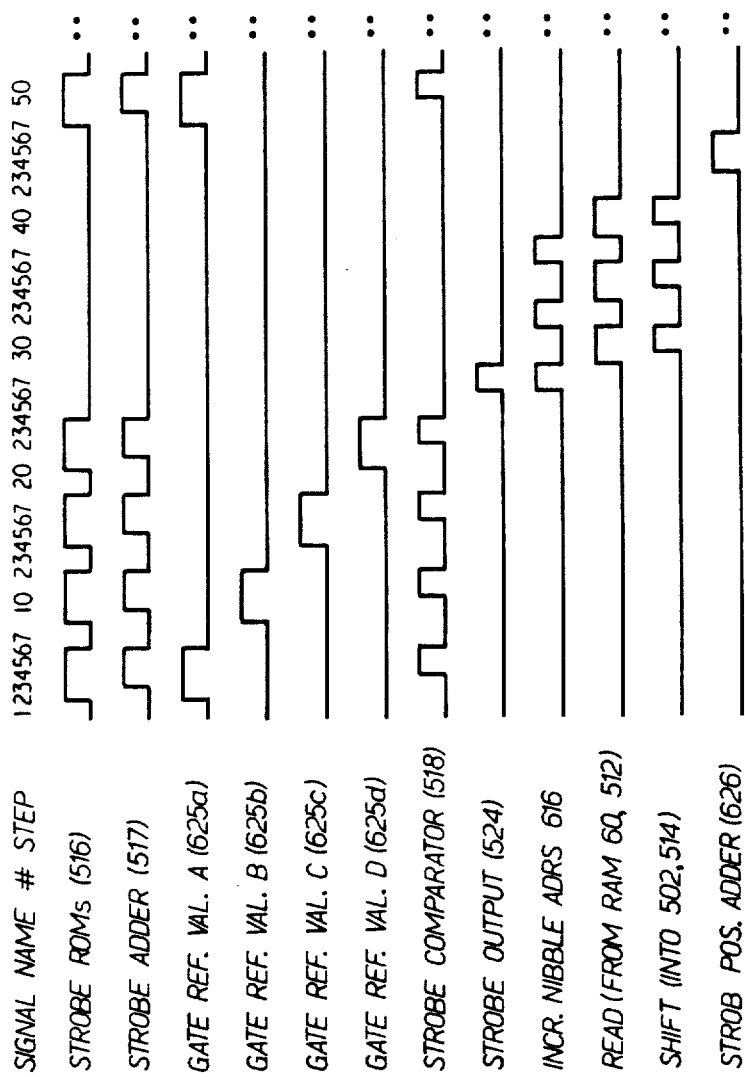
FIG. 7 is a timing diagram for various signals in the circuits represented by FIGS. 5 and 6.

FIG. 7 is a timing diagram for various signals as indicated in FIGS. 5 and 6. The Bit Gate signals 523a, 523b, 523c, and 523d (selecting successively the gates into bit register 508) are identical to the Reference selecting signals 625a etc, and are omitted from the diagram.

The example shown in FIGS. 5 and 6 is illustrative, in that it shows selection of samples contributing to a bit determination, use of read only memories to produce signals depending not only on a selection of the samples contributing but also on other binary data, use of an adder to combine these signals produced by the ROMs, use of a comparitor to test the resulting signal against a number of references, and use of voting logic to determine the bit value as a function of those tests. In many cases some parts of this assembly may be omitted. In particular where only a small number of samples have any bearing on a bit value, the entire process may be performed by a single ROM. In other cases the complete testing logic might include several sets of the logic shown in FIG. 5, perhaps varying in the samples chosen to participate, in the size of the ROMs, in the presence or otherwise of an adder, and in the number of reference values to be used. These separate logical elements would normally be combined in the end with a more complicated voting circuit which might rank determinations from one set of logic as more reliable than those from another.

It will be appreciated that the processing technique of the invention permits processing of the initial signal in a non-linear fashion, and in a way that takes values received before and after a value concerned into account. This latter aspect is particularly important as the density of digital data increases and the raw signal for any one bit is more and more influenced by the values of the neighbouring bits. By storing digital values for these neighbouring bits and using those values in the determination of the final digital values for the bit of concern, the effect of the neighbouring bits is reduced.

Although it would be possible to achieve the results of the invention in an analog circuit, the development and maintenance of such a circuit would be more difficult than for a digital circuit. A digital circuit, such as the circuit disclosed, could be more readily simulated by digital computers, more readily realized in large scale intergrated (LSI) circuits, and more readily tested.

We claim:

1. Apparatus for processing an electrical signal produced by one or more sensors in a device for reading binary storage media, which signal represents a set of successive stored binary values, comprising:
    digital circuitry means for combining digital values which represent respective different plural selections of two or more samples of the electrical signal to produce intermediate digital representations of the samples of the respective selections; and
    means for processing each said intermediate digital representation to derive a respective one of the said binary values.

2. Apparatus according to claim 1 wherein said digital circuitry means further includes means for producing a set of said digital values representing samples of the electrical signal, said digital circuitry means then combining the digital values for each said selection in turn.

3. Apparatus according to claim 2 wherein said producing means is such that said electrical signal is successively sampled and digitised to produce said digital value.

4. Apparatus according to claim 1 wherein said processing means is arranged to compare the intermediate digital representation, and/or a derivation of the intermediate digital representation, with one or more reference levels, and to output a binary value in dependence on such comparison.

5. Apparatus according to claim 4 wherein said processing means further includes adders and/or Boolean logic processors for combining and/or comparing the intermediate digital representation, or a derivative thereof, with one or more reference logical tests.

6. Apparatus according to claim 4 further including computing means arranged to read said or another electrical signal and determine values for said reference levels and/or for said logical tests.

7. Apparatus according to claim 1 wherein said digital circuitry means is arranged so that each sample is included in a plurality of the selections and thereby contributes to a plurality of the intermediate digital representations.

8. Apparatus according to claim 1 wherein said digital circuitry means is arranged for also combining the digital values for each selection of samples with one or more further digital values providing information about the electrical signal and/or about the relationship of samples within the electrical signal.

9. Apparatus according to claim 1 wherein said digital circuitry means includes a digital shift register whose contents provide an address for a memory store of predetermined values which indicate the propensity for a binary value to be 1, or of the correct output binary values.

10. Apparatus according to claim 1 wherein said processing means is arranged to derive a vector dot product of a vector comprising the intermediate digital representation with another vector which is chosen from a set of one or more constant vectors.

11. Apparatus for reading information comprising a set of successive binary values stored in a medium as multiple machine readable record entries arranged in frames which are themselves arranged in one or more channels, which record entries are indicative of values from a limited set of possible values, the apparatus comprising:
- a holder to temporarily support or retain said medium;
- a substantially known array of detector elements movable relative to said holder;
- means to scan each frame with said array such that each record entry is at least partly within the field of observation of at least one detector element to produce a first set of observed values for each frame represented by the state and/or outputs of the detector elements;
- means to output those states and/or outputs as an electrical signal comprising a sequence of observed values representing said stored binary values;
- digital circuitry means for combining digital values which represent respective different plural selections of two or more samples of the electrical signal to produce intermediate digital representations of the samples of the respective selections; and
- means for processing each said intermediate digital representation to derive a respective one of the said binary values.

12. A method of processing an electrical signal produced by one or more sensors in a device for reading binary storage media, which signal represents a set of successive stored binary values, comprising:
- combining digital values which represent a selection of two or more samples of the electrical signal, using digital circuits, to produce an intermediate digital representation of the samples of the selection;
- processing said intermediate digital representation to derive one of the said binary values; and
- repeating said combining and processing steps for other different selections of samples of said electrical signal whereby to obtain said set of successive stored binary values.

13. A method according to claim 12 wherein the digital values for each selection of samples are also combined with one or more further digital values providing information about the electrical signal and/or about the relationship of samples within the electrical signal.

14. A method according to claim 13 wherein each said selection of samples is dependent upon said further digital value(s).

15. A method according to claim 14 wherein said selection is made with regard to a predetermined spatial relationship between a plurality of secondary sources, said secondary sources generating said electrical signal; and a plurality of primary sources to which said secondary sources are responsive.

16. A method according to claim 12 wherein said processing of each intermediate digital representation further includes comparing the intermediate digital representation, and/or a derivation of the intermediate digital representation, with one or more reference levels, and outputting a binary value in dependence on such comparison.

17. A method according to claim 16 wherein plural such reference levels are provided by way of logical tests and the comparison is made with one or more of these levels in a predetermined sequence.

18. A method according to claim 17 further comprising reading said or another electrical signal and determining values for said reference levels.

19. A method according to claim 12 wherein said processing of each intermediate digital representation includes utilizing the representation to address a memory store of predetermined values which indicate the propensity for a binary value to be 1.

20. A method according to claim 19 wherein said memory store has been computed from a mathematical model of the sensing apparatus.

21. A method according to claim 19 wherein the contents of the aforesaid address are utilized by being directly output as the binary value for the set.

22. A method according to claim 12 comprising producing a set of said digital values representing samples of the electrical signal and then combining the digital values for each said selection in turn.

23. A method according to claim 22 wherein said electrical signal is successively sampled and digitised to produce said digital values.

24. A method according to claim 12 wherein said processing includes deriving a vector dot product of a vector comprising the intermediate digital representation with another vector which is chosen from a set of one or more constant vectors.

25. A method according to claim 24 wherein said other vector is selected by the said further digital values.

26. A method according to claim 12 wherein said electrical signal itself comprises a sequence of samples so that said digital values represent some or all of the samples of the sequence.

27. A method according to claim 12 wherein each sample is included in a plurality of the selections and thereby contributes to a plurality of the intermediate digital representations.

28. A method according to claim 12 wherein each selection of two or more samples comprises a selection of immediately successive samples.

29. A method according to claim 12 wherein two or more of the intermediate digital representations are processed together to derive each binary value.

30. A method according to claim 12 where the electrical signal is digitized, and the digitized values are processed by a microprocessor to obtain the binary values they represent.

31. A method of reading information comprising a set of successive binary values stored in a medium as multiple machine readable record entries arranged in frames which are themselves arranged in one or more channels, which record entries are indicative of values from a limited set of possible values, the method comprising:

observing each frame in turn with a substantially known array of detector elements such that each record entry is at least partly within the field of observation of at least one detector element, whereby to produce a first set of observed binary values for each frame represented by the states and/or outputs of the detector elements;

outputting those states and/or outputs as an electrical signal comprising a sequence of observed values representing said stored binary values;

combining digital values which represent a selection of two or more samples of the electrical signal, using digital circuits, to produce an intermediate digital representation of the samples of the selection;

processing said intermediate digital representation to derive one of the said binary values; and repeating said combining and processing steps for other different selections of samples of said electrical signal whereby to obtain said set of successive stored or communicated binary values.

* * * * *